(12) United States Patent
Kumagai et al.

(10) Patent No.: US 9,587,674 B2
(45) Date of Patent: *Mar. 7, 2017

(54) SLIDING BEARING

(71) Applicant: DAIDO METAL COMPANY LTD., Nagoya (JP)

(72) Inventors: Yuichi Kumagai, Inuyama (JP); Akiyoshi Imamura, Inuyama (JP)

(73) Assignee: Daido Metal Company Ltd., Nagoya (JP)

(*) Notice: Subject to any disclaimer, the term of this patent is extended or adjusted under 35 U.S.C. 154(b) by 73 days.

This patent is subject to a terminal disclaimer.

(21) Appl. No.: 14/640,073

(22) Filed: Mar. 6, 2015

(65) Prior Publication Data

US 2015/0260222 A1 Sep. 17, 2015

(30) Foreign Application Priority Data

Mar. 14, 2014 (JP) ................................. 2014-051943

(51) Int. Cl.
*F16C 33/02* (2006.01)
*F16C 33/04* (2006.01)
(Continued)

(52) U.S. Cl.
CPC ............ *F16C 33/046* (2013.01); *F16C 17/02* (2013.01); *F16C 33/08* (2013.01); *F16C 33/122* (2013.01); *F16C 25/04* (2013.01)

(58) Field of Classification Search
CPC .... F16C 9/02; F16C 9/04; F16C 17/02; F16C 17/022; F16C 25/02; F16C 25/04;
(Continued)

(56) References Cited

U.S. PATENT DOCUMENTS 2,283,918 A * 5/1942 Dekome ................. F16C 17/02
29/898.056
4,909,638 A * 3/1990 Muto ..................... F16C 17/022
384/273
(Continued)

FOREIGN PATENT DOCUMENTS

CN 103438098 12/2013
CN 203604431 5/2014
(Continued)

OTHER PUBLICATIONS

Great Britain Examination Report dated Sep. 4, 2015.

*Primary Examiner* — James Pilkington
(74) *Attorney, Agent, or Firm* — Harness, Dickey & Pierce, PLC

(57) ABSTRACT

Disclosed is a sliding bearing having a cylindrical shape, including: a Fe alloy back metal layer on an outside diameter side of the cylindrical shape and a sliding layer on an inside diameter side; and a first and second circumferential direction end surfaces, the first and the second circumferential direction end surfaces facing each other, a plurality of hardened convex portions projecting toward the second circumferential direction end surface being formed on the first circumferential direction end surface, a plurality of hardened concave portions corresponding to the plurality of hardened convex portions being formed on the second circumferential direction end surface, a first hardened area being formed on each of the hardened convex portions of the first circumferential direction end surface and its vicinity, and a second hardened area being formed on each of the hardened concave portions of the second circumferential direction end surface and its vicinity.

15 Claims, 7 Drawing Sheets

(51) Int. Cl.
  *F16C 17/02* (2006.01)
  *F16C 33/08* (2006.01)
  *F16C 33/12* (2006.01)
  *F16C 25/04* (2006.01)

(58) Field of Classification Search
  CPC ........ F16C 29/03; F16C 33/046; F16C 33/08;
  F16C 33/122
  See application file for complete search history.

(56) References Cited

U.S. PATENT DOCUMENTS 8,894,292 B2 * 11/2014 Yamakawa ............... F16C 9/02
  384/570
9,194,427 B2 * 11/2015 Kumagai ............. F16C 33/122

FOREIGN PATENT DOCUMENTS

| | | |
|---|---|---|
| JP | 63-051923 | 3/1988 |
| JP | 05-044729 | 2/1993 |
| JP | 06-264928 | 9/1994 |
| JP | 2004-011898 | 1/2004 |
| JP | 2005-090650 | 4/2005 |
| JP | 2009-228725 | 10/2009 |

* cited by examiner

FIG.7
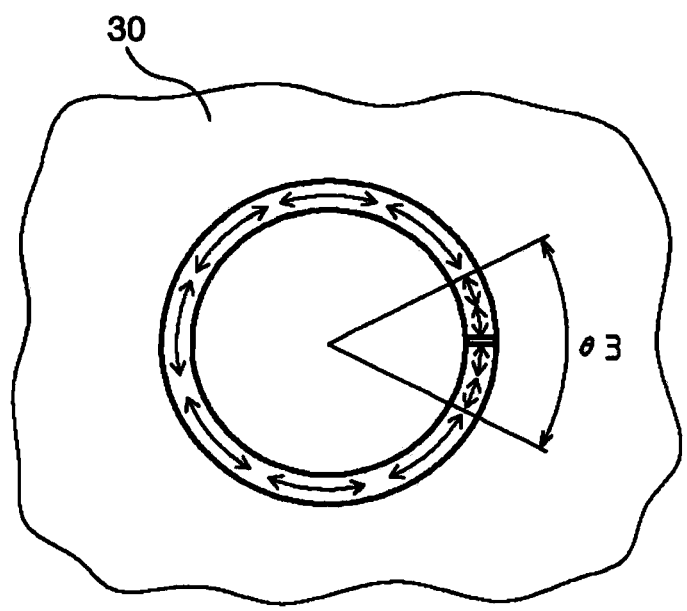
PRIOR ART    FIG.8
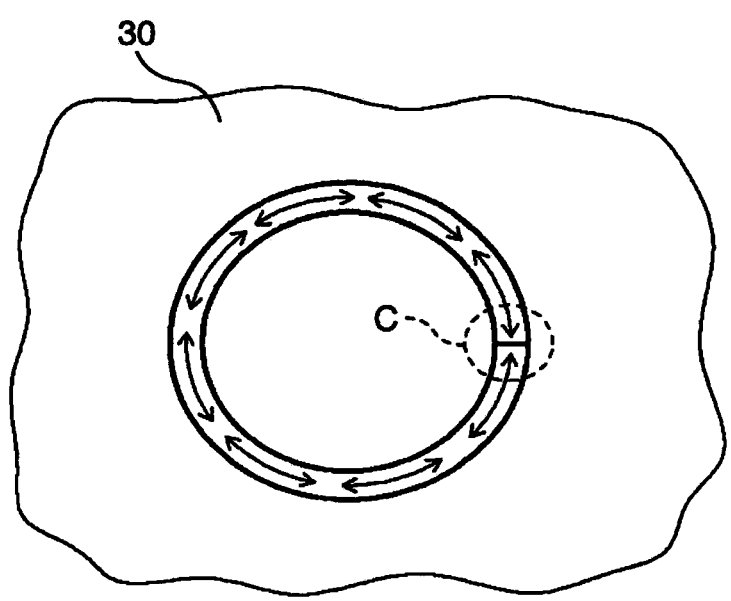

c

SLIDING BEARING

INCORPORATION BY REFERENCE

The present application claims priority from JP Patent Application Ser. No. 2014-051943 filed on Mar. 14, 2014, the content of which is hereby incorporated by reference into this application.

BACKGROUND OF THE INVENTION (1) Field of the Invention

The present invention relates to a sliding bearing having a cylindrical shape.

(2) Description of Related Art

JP-A-2009-228725 (see paragraphs [0002], [0003], [0013] and the like) discloses a sliding bearing in which a multilayer material composed of a Fe alloy back metal layer and a bearing alloy layer is formed into a cylindrical shape such that the Fe alloy back metal layer becomes an outside diameter side. A surface of the bearing alloy layer supports a corresponding shaft, and strength of the sliding bearing mainly relates to the Fe alloy back metal layer. The sliding bearing is press-fitted into a bearing holding hole of a bearing housing, fixed, and used. More specifically, the outside diameter (outer circumferential length) of the sliding bearing is set to be slightly larger than an inside diameter (inner circumferential length) of the bearing holding hole of the bearing housing, and this size difference is called an interference. With this tightening margin, when the sliding bearing is press-fitted into the bearing holding hole of the bearing housing, compressive stress in a circumferential direction and a radial direction is generated inside the sliding bearing, and the sliding bearing is fixed to the bearing holding hole.

As a typical configuration of circumferential direction both ends of the sliding bearing, there are a butt type and a clinch type. JP-A-2004-11898 (see FIGS. 1 and 6 and the like) discloses the butt type. Circumferential direction both end surfaces of a sliding bearing are flat surfaces and have a space between the circumferential direction both end surfaces in a free state before being press-fitted into a bearing holding hole. When the sliding bearing is press-fitted into a bearing holding hole of a bearing housing, the circumferential direction both end surfaces come in contact with each other.

JP-A-6-264928 discloses the clinch type. A cylindrical bearing includes a clinch configured with a convex portion and a concave portion on longitudinal direction both ends of a plate material in a developed state before being formed into a cylindrical shape. The plate material is formed into the cylindrical shape, and at the same time, the convex portion and the concave portion mesh with and connect to each other and the cylindrical bearing is manufactured.

Further, in a sliding bearing in which a pair of split bearings butts against each other to form a cylindrical shape, there have been made proposals of decreasing a strength of an circumferential direction end locally by forming a convex portion, a hole, or a slit on the circumferential direction both ends or one of the circumferential direction ends of the split bearing (see JP-U-63-51923, JP-A-5-44729, and JP-A-2005-90650). In these, in a state that the pair of the split bearings is assembled into respective semicylindrical shape bearing holding holes of a split type bearing housing, the split type bearing housing is fastened with a bolt to be integrated. In the fastening process with the bolt, the circumferential direction end of the split bearing is plastically deformed locally, or an elastic deformation amount of the circumferential direction end is increased, so that circumferential direction compressive stress generated inside the sliding bearing is decreased.

SUMMARY OF THE INVENTION

When the sliding bearing of the butt type in JP-A-2004-11898, or of the clinch type in JP-A-6-264928 is press-fitted into a bearing holding hole of a bearing housing, the sliding bearing receives compressive force in a circumferential direction, the circumferential direction both end surfaces pushing each other, one of the circumferential direction ends or both circumferential direction ends (in a case of the clinch type, mainly the convex portion in a concave and convex engaging part) being deformed toward an inside diameter side of the bearing locally, and the deformation part coming in contact with a shaft, so that the sliding bearing may be damaged (see FIG. 9). Further, in a case where the shape of the circumferential direction end of the split bearing in JP-U-63-51923, JP-A-5-44729, or JP-A-2005-90650 is applied to the cylindrical shape sliding bearing in JP-A-2009-228725, JP-A-2004-11898, or JP-A-6-264928, a deformation amount of the circumferential direction end toward the inside diameter side of the bearing further increases than before.

Thus, an object of the present invention is to provide a sliding bearing in which deformation of a circumferential direction end toward a bearing inside diameter side is suppressed.

In order to solve the above problem, the present invention provides a sliding bearing having a cylindrical shape, and the sliding bearing includes a Fe alloy back metal layer on an outside diameter side of the cylindrical shape and a sliding layer on an inside diameter side of the cylindrical shape, and a first circumferential direction end surface and a second circumferential direction end surface, the first circumferential direction end surface and the second circumferential direction end surface facing each other. There is a first circumferential direction space S1 in a free state between the first circumferential direction end surface and the second circumferential direction end surface, a plurality of hardened convex portions projecting toward the second circumferential direction end surface being formed on the first circumferential direction end surface, a plurality of hardened concave portions corresponding to the plurality of hardened convex portions being formed on the second circumferential direction end surface, a dimensional relation between a maximum height LK1 of a top of each of the hardened convex portions from the first circumferential direction end surface and a maximum depth LK2 of a bottom of each of the corresponding hardened concave portions from the second circumferential direction end surface being LK1>LK2, each of the hardened convex portions having a width HK1 in an axial direction of the sliding bearing on the first circumferential direction end surface, each of the hardened concave portions having a width HK2 in the axial direction on the second circumferential direction end surface, and a dimensional relation between the width HK1 of each of the hardened convex portions and the width HK2 of each of the corresponding hardened concave portions being HK1<HK2.

Herein, the maximum height LK1 of each of the hardened convex portions is a circumferential length along an outer circumferential surface of the sliding bearing from each of flat surfaces of the first circumferential direction end surface to the top of each of the hardened convex portions, and the maximum depth LK2 of each of the hardened concave portions is a length in the circumferential direction along the outer circumferential surface (virtual surface) of the sliding bearing from each of flat surfaces of the second circumferential direction end surface to the bottom (deepest portion) of each of the hardened concave portions.

Further, a first hardened area KR1 is formed on each of the hardened convex portions of the first circumferential direction end surface and its vicinity, the Fe alloy back metal layer being hardened in the first hardened area KR1 such that a hardness of the Fe alloy back metal layer is maximum on the top of each of the hardened convex portions and gradually decreases toward a circumferential direction central portion side of the sliding bearing, and a second hardened area KR2 is formed on each of the hardened concave portions of the second circumferential direction end surface and its vicinity, the Fe alloy back metal layer being hardened in the second hardened area KR2 such that a hardness of the Fe alloy back metal layer is maximum on the bottom of each of the hardened concave portions and gradually decreases toward the circumferential direction central portion side of the sliding bearing.

Herein, "the first circumferential direction space S1" is a length in the circumferential direction on an outer circumferential surface side of the sliding bearing between each of the flat surfaces of the first circumferential direction end surface and each of the flat surfaces of the second circumferential direction end surface.

Herein, the first hardened area KR1 is an area where a value of the hardness of the Fe alloy back metal layer measured with a micro Vickers hardness meter is maximum on the top of each of the hardened convex portions and gradually decreases toward the circumferential direction central portion side of the sliding bearing. The first hardened area KR1 is an area satisfying a condition that the value of the hardness is larger by 10% or more than the value of the hardness of the Fe alloy back metal layer on the circumferential direction central portion side of the sliding bearing measured with the micro Vickers hardness meter.

Herein, the second hardened area KR2 is an area where a value of the hardness of the Fe alloy back metal layer measured with the micro Vickers hardness meter is maximum on the bottom of each of the hardened concave portions and gradually decreases toward the circumferential direction central portion side of the sliding bearing. The second hardened area KR2 is an area satisfying a condition that the value of the hardness is larger by 10% or more than the value of the hardness of the Fe alloy back metal layer on the circumferential direction central portion side of the sliding bearing measured with the micro Vickers hardness meter.

In another embodiment of the present invention, the plurality of hardened convex portions and a plurality of flat surfaces are formed on the first circumferential direction end surface, each of the hardened convex portions and each of the flat surfaces being alternately arranged in the axial direction of the sliding bearing, and both ends in the axial direction being the flat surfaces.

In another embodiment of the present invention, the plurality of hardened concave portions and a plurality of flat surfaces are formed on the second circumferential direction end surface, each of the hardened concave portions and each of the flat surfaces being alternately arranged in the axial direction of the sliding bearing, and both ends in the axial direction being the flat surfaces.

In another embodiment of the present invention, each of the flat surfaces of the first circumferential direction end surface and each of the flat surfaces of the second circumferential direction end surface extend in a direction intersecting perpendicularly with the circumferential direction of the sliding bearing.

In another embodiment of the present invention, the width in the axial direction of the sliding bearing is constant across a whole length in the circumferential direction.

In another embodiment of the present invention, the maximum height LK1 of the top of each of the hardened convex portions is located on a central portion of the width HK1, and a height of each of the hardened convex portions gradually decreases from the top toward both ends in a width direction of each of the hardened convex portions.

In another embodiment of the present invention, the maximum depth LK2 of the bottom of each of the hardened concave portions is located on a central portion of the width HK2, and a depth of each of the hardened concave portions gradually decreases from the bottom toward both ends in a width direction of each of the hardened concave portions.

In another embodiment of the present invention, the maximum height LK1 of each of the hardened convex portions has a length corresponding to 0.3 to 2% of an outer circumferential length of the sliding bearing.

In another embodiment of the present invention, the maximum heights LK1 of the plurality of hardened convex portions are the same as each other and the widths HK1 of the plurality of hardened convex portions are the same as each other, and the maximum depths LK2 of the plurality of hardened concave portions are the same as each other and the widths HK2 of the plurality of hardened concave portions are the same as each other.

In another embodiment of the present invention, a second circumferential direction space S2 is formed between the first circumferential direction end surface and the second circumferential direction end surface in a state that the first circumferential direction end surface butts against the second circumferential direction end surface and the top of each of the hardened convex portions comes in contact with the bottom of each of the hardened concave portions.

In another embodiment of the present invention, the second circumferential direction space S2 has a length corresponding to 0.2 to 1% of the outer circumferential length of the sliding bearing.

In another embodiment of the present invention, the plurality of hardened convex portions are formed on only the first circumferential direction end surface, and the plurality of hardened concave portions are formed on only the second circumferential direction end surface.

In another embodiment of the present invention, each of the hardened convex portions is formed also on the second circumferential direction end surface, and each of the hardened concave portions is formed also on the first circumferential direction end surface.

In another embodiment of the present invention, the first hardened area KR1 of the first circumferential direction end surface is formed within a range of a central angle θ1 of 2° to 15°, and more preferably within a range of a central angle θ1 of 2° to 7.5°, from the top of each of the hardened convex portions toward the circumferential direction central portion side of the sliding bearing.

In another embodiment of the present invention, the second hardened area KR2 of the second circumferential direction end surface is formed within a range of a central angle θ2 of 2° to 15°, and more preferably within a range of a central angle θ2 of 2° to 7.5°, from the bottom of each of the hardened concave portions toward the circumferential direction central portion side of the sliding bearing.

The sliding bearing of the present invention is elastically deformed in the state of being press-fitted into the bearing holding hole of the bearing housing so that the outside diameter (circumferential length) of the sliding bearing becomes smaller. The sliding bearing of the present invention includes the plurality of hardened convex portions, hardened concave portions, and hardened areas on the circumferential direction ends, and thus an elastic deformation amount of a non-hardened area occupying the most part of the cylindrical portion of the sliding bearing except for the areas of the circumferential direction ends becomes relatively smaller. Therefore, one of or both of the circumferential direction ends of the sliding bearing are prevented from swelling to be deformed toward the inside diameter side of the sliding bearing. Accordingly, the circumferential direction end of the sliding bearing is less likely to swell toward the inside diameter side and come in contact with the shaft to be damaged.

BRIEF DESCRIPTION OF THE DRAWING

FIG. 7 is a view illustrating the sliding bearing of the present invention, the sliding bearing being press-fitted into a bearing holding hole of a housing;

FIG. 8 is a view illustrating a conventional sliding bearing forced into the bearing holding hole of the housing;

DETAILED DESCRIPTION OF THE INVENTION

Figure 1:
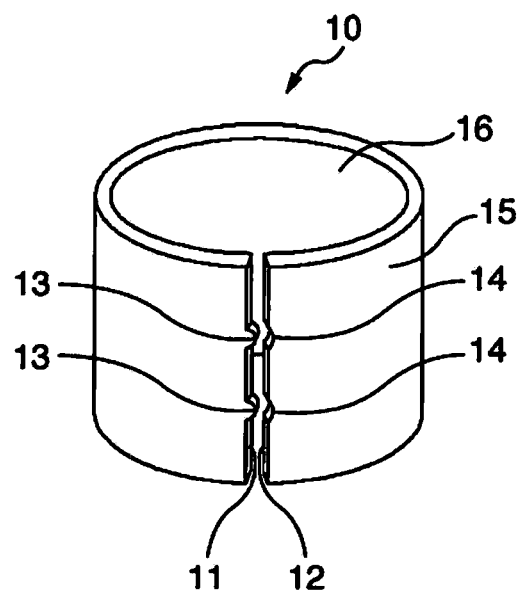
FIG. 1 is a schematic perspective view illustrating a sliding bearing of a first embodiment of the present invention in a free state.

FIG. 1 illustrates a sliding bearing 10 of a first embodiment of the present invention in a free state. The sliding bearing 10 has a cylindrical shape and includes a Fe alloy back metal layer 15 on an outside diameter side of the cylindrical shape and the sliding layer 16 on an inside diameter side of the cylindrical shape. As the sliding layer 16, a bearing alloy such as an Al alloy and a Cu alloy, or a resin composition for sliding can be used. Further, a porous metal layer may be formed on the Fe alloy back metal layer 15, and a resin composition may be covered on the porous metal layer. As the Fe alloy back metal layer 15, a Fe alloy capable of being formed into a cylindrical shape can be used, and a low carbon steel (Fe alloy having a carbon content of 0.05 to 0.25 mass %) or a stainless steel can be used as one example.

Figure 2:
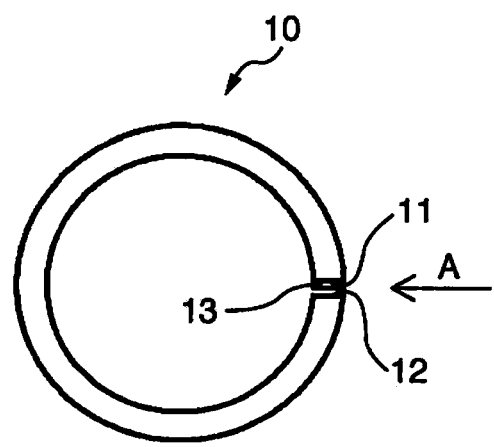
FIG. 2 is a side view when viewed from an axial direction of the sliding bearing of FIG. 1.
Figure 3:
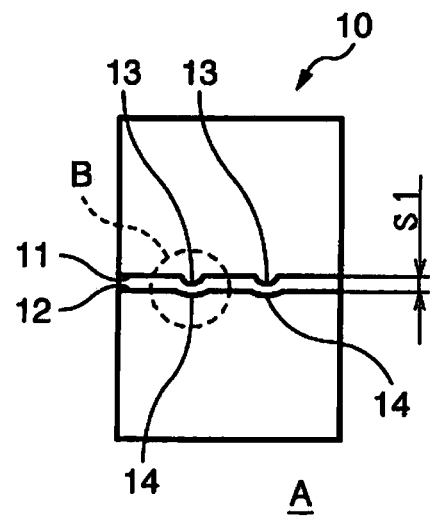
FIG. 3 is a view when viewed from an arrow A direction of FIG. 2.

The sliding bearing includes two circumferential direction end surfaces 11, 12, and a first circumferential direction space S1 is formed between the circumferential direction both end surfaces in a free state (FIGS. 1 to 3). Though a dimension of the first circumferential direction space S1 is different depending on a specification of the sliding bearing (outside diameter, wall thickness of the bearing (total thickness of the Fe alloy layer and the sliding layer)), the first circumferential direction space S1 is about 0.5 to 1.0 mm, for example when the outside diameter is 30 mm and the bearing wall thickness is 2.0 mm.

On one of the circumferential direction end surfaces (first circumferential direction end surface 11), there are formed a plurality of hardened convex portions 13 projecting toward the other one of the circumferential direction end surfaces (second circumferential direction end surface 12), and on the second circumferential direction end surface 12, there are formed a plurality of hardened concave portions 14 making a pair with the hardened convex portions 13.

The first circumferential direction end surface 11 is a flat surface except for the portion where the hardened convex portion 13 is formed, and the hardened convex portion 13 and the flat surface are alternately arranged in an axial direction of the sliding bearing 10. Both ends in the axial direction of the first circumferential direction end surface 11 are the flat surfaces. The flat surface of the first circumferential direction end surface 11 extends in a direction intersecting perpendicularly with the circumferential direction of the sliding bearing (axial direction). Further, the plurality of flat surfaces of the first circumferential direction end surface 11 extend on a virtual same plane.

The second circumferential direction end surface 12 is a flat surface except for the portion where the hardened concave portion 14 is formed, and the hardened concave portion 14 and the flat surface are alternately arranged in the axial direction of the sliding bearing 10. Both ends in the axial direction of the second circumferential direction end surface 12 are the flat surfaces. The flat surface of the second circumferential direction end surface 12 extends in the direction intersecting perpendicularly with the circumferential direction of the sliding bearing (axial direction). Further, the plurality of flat surfaces of the second circumferential direction end surface 12 extend on a virtual same plane.

Figure 10:
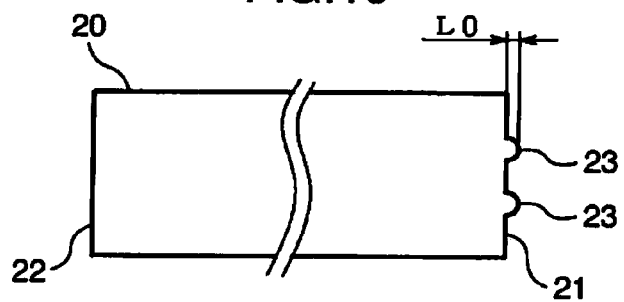
FIG. 10 is a view illustrating a plate for manufacturing the present invention.
Figure 11:
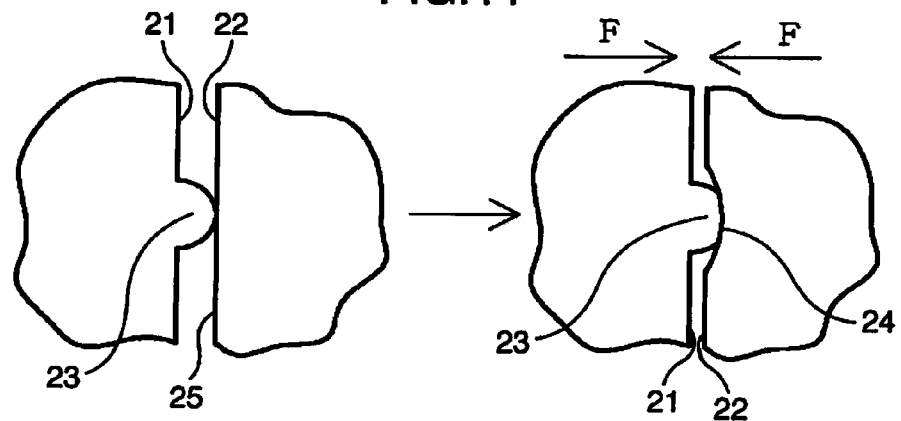
FIG. 11 is a view illustrating a method of forming the hardened convex portion and the hardened concave portion of the present invention.

Herein, description is given of a method of forming the hardened convex portion 13 and the hardened concave portion 14 of the present invention (FIGS. 10 and 11). A multilayer material composed of the Fe alloy back metal layer and the sliding layer is pressed to form a strip shape plate 20 having a predetermined size as illustrated in FIG. 10. At this time, a plurality of convex portions 23 each having a semicircular arc shape or a semielliptical arc shape and having a predetermined height L0 is formed on a first side surface 21 of the plate, the first side surface 21 becoming the first circumferential direction end surface of the sliding bearing. A second side surface 22 that becomes the second circumferential direction end surface of the sliding bearing is formed on a flat surface 25.

The plate 20 is formed into a cylindrical shape such that the first side surface 21 butts against the second side surface 22 with a forming jig and a press (not illustrated) and the Fe alloy back metal layer becomes an outside diameter side. The left view of FIG. 11 illustrates a state that the plate is formed into the substantially cylindrical shape, and the convex portion 23 of the first side surface 21 comes in contact with the flat surface 25 of the second side surface 22. Then, in the plate having the substantially cylindrical shape, the convex portion 23 and the flat surface 25 are further pushed with external force F in a compressive direction in the circumferential direction in a state that an inside diameter and the outside diameter of the cylindrical shape are restricted as illustrated in the right view of FIG. 11. The convex portion 23 of the first side surface 21 is plastically deformed and the length L0 is decreased. At the same time, the flat surface 25 of the second side surface 22 is plastically deformed, and a concave portion 24 is formed.

The convex portion after the forming is the "hardened convex portion", and the concave portion is the "hardened concave portion". The hardened convex portion and the hardened concave portion are portions where a plastic deformation amount is larger locally than that in the other portion (cylindrical portion except for the circumferential direction end) by pushing between the convex portion and the flat surface at the time of the forming. Inside the Fe alloy back metal layer near the convex portion and the concave portion, residual stress is high and a hardness of the Fe alloy back metal layer increases as compared with those in the other portion. More specifically, inside the Fe alloy back metal layer near the hardened convex portion and the hardened concave portion, the residual stress is generated so as to show the maximum deformation resistance to the external force that compresses the sliding bearing in the circumferential direction.

Figure 4:
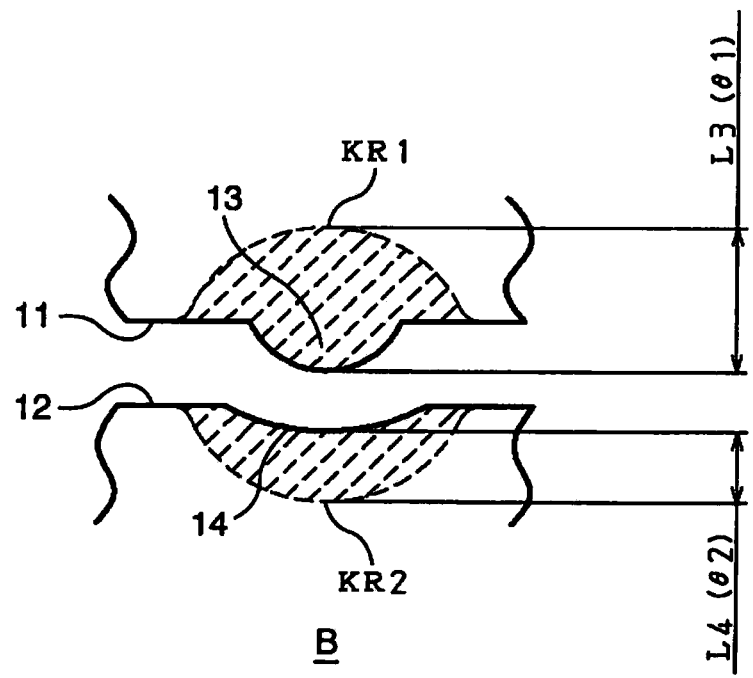
FIG. 4 is an enlarged view of a portion B of FIG. 3.

A first hardened area KR1 is formed on the Fe alloy back metal layer near the hardened convex portion 13 of the first circumferential direction end surface 11, and a second hardened area KR2 is formed on the Fe alloy back metal layer near the hardened concave portion 14 of the second circumferential direction end surface 12 (hatching portions in FIG. 4). With reference to FIG. 4, description is given of the hardness of the Fe alloy back metal layer in the first hardened area KR1 and the second hardened area KR2. FIG. 4 is a view illustrating a vicinity of the circumferential direction end surface of the sliding bearing when viewed from the outside diameter side in a planar manner. The hardness of the Fe alloy back metal layer near a top of the hardened convex portion 13 and a bottom of the hardened concave portion 14 is maximum, and the hardness gradually decreases from the top and the bottom radially (hardness decreases toward an outer edge line side of a substantially circular arc in each hatching portion in FIG. 4).

When the compressive external force in the circumferential direction at the time of the forming is removed (in the free state), the first circumferential direction space S1 between the circumferential direction both end surfaces of the sliding bearing (space between the flat surface of one of the circumferential direction end surfaces and the flat surface of the other one of the circumferential direction end surfaces) is formed, and in addition, a space is formed between the top of the hardened convex portion 13 and the bottom of the hardened concave portion 14 (see FIG. 4).

Herein, description is given of a forming range of each of the first hardened area KR1 and the second hardened area KR2. As described above, the hardened area in which the Fe alloy back metal layer is hardened is formed on each of one of the circumferential direction ends and the other one of the circumferential direction ends. The first hardened area KR1 is an area where a value of the hardness of the Fe alloy back metal layer measured with a micro Vickers hardness meter is maximum on the top of the hardened convex portion and gradually decreases toward a circumferential direction central portion side of the sliding bearing. The first hardened area KR1 is an area satisfying a condition that a value of the hardness is larger by 10% or more than the value of the hardness of the Fe alloy back metal layer on the circumferential direction central portion side of the sliding bearing measured with the micro Vickers hardness meter.

The value of the hardness of the Fe alloy back metal layer is a value measured using the micro Vickers hardness meter under a condition of a measuring load of 200 g. The measurement is performed on a section in which the sliding bearing is cut in the circumferential direction at a central position of the top of the hardened convex portion and the bottom of the hardened concave portion.

"The value of the hardness on the circumferential direction central portion side of the sliding bearing" means a value of the hardness of the Fe alloy back metal layer on the cylindrical portion (non-hardened area) that has not influenced by the locally increased hardness of the Fe alloy back metal layer by forming the hardened convex portion and the hardened concave portion. For example, it is an average value of values obtained by measuring the hardness of the Fe alloy back metal layer on the cylindrical portion every central angle of 10°, except for a portion of a central angle of 30° from the first circumferential direction end surface of the sliding bearing toward the circumferential direction central portion side of the sliding bearing, and a portion of a central angle of 30° from the second circumferential direction end surface toward the circumferential direction central portion side.

In order to confirm the forming range of the first hardened area KR1, in the same manner as the measurement of "the value of the hardness on the circumferential direction center central side of the sliding bearing", the hardness of the Fe alloy back metal layer in the first hardened area KR1 is measured. By measuring the hardness of the Fe alloy back metal layer every predetermined central angle (for example, 0.5°) from the top side of the hardened convex portion toward the circumferential direction central portion side of the sliding bearing, it is possible to confirm that the value of the hardness gradually decreases and becomes "the value of the hardness on the circumferential direction central portion side of the sliding bearing". The forming range θ1 of the first hardened area KR1 of the present invention is represented by a central angle from the top position of the hardened convex portion toward the circumferential direction central portion side of the sliding bearing to a position where a value of the hardness is larger by 10% than "the value of the hardness on the circumferential direction central portion side of the sliding bearing". The range θ1 of the first hardened area KR1 is preferably a central angle of 2° to 15°, and more preferably 2° to 7.5°.

The forming range of second hardened area KR2 can be confirmed in the same manner as the method of confirming the forming range of the first hardened area KR1. The forming range θ2 of the second hardened area KR2 is represented by a central angle from the bottom of the hardened concave portion toward the central portion side of the sliding bearing to a position where a value of the hardness is larger by 10% than "the value of the hardness on the circumferential direction central portion side of the sliding bearing". In the range of the second hardened area KR2, the central angle θ2 from the bottom of the hardened concave portion toward the circumferential direction central portion side of the sliding bearing is preferably 2° to 15°, and more preferably 2° to 7.5°.

Like the first embodiment, in a case where the sizes (length, width) of the plurality of hardened convex portions are the same as each other and the sizes of the plurality of the hardened concave portions are the same as each other, the forming ranges of the first hardened areas KR1 adjacent to the hardened convex portions have values of the substantially same central angle as each other, and the forming ranges of the second hardened areas KR2 adjacent to the hardened concave portions have values of the substantially same central angle as each other. Unlike the embodiment, in a case where the sizes of some of the plurality of hardened convex portions, or the sizes of some of the plurality of the hardened concave portions are different, the forming ranges of the hardened areas adjacent to the hardened convex portions may be different from each other, or the forming ranges of the hardened areas adjacent to the hardened concave portions may be different from each other. In such a case, the forming ranges θ1 of some of the first hardened areas KR1 and the forming ranges θ2 of some of the second hardened areas KR2 each have only to satisfy the range of the above described central angle.

Figure 5:
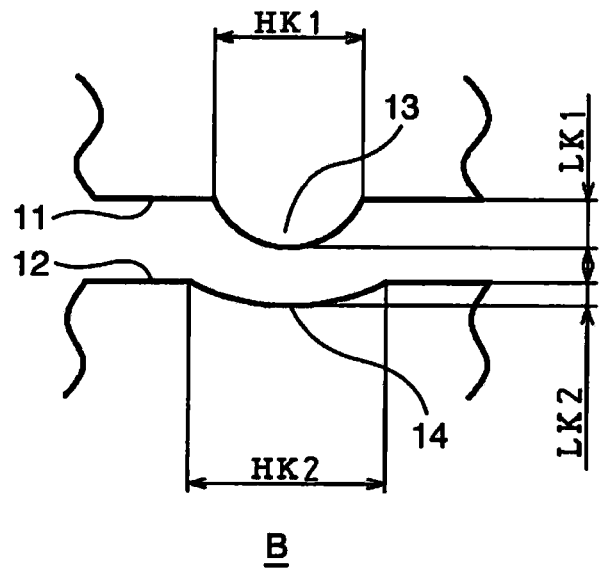
FIG. 5 is an enlarged view of the portion B of FIG. 3.

The hardened convex portion 13 has a width HK1 in the axial direction and has the top having a maximum height LK1 on a central portion of the width (see FIG. 5). The height of the hardened convex portion 13 gradually decreases from the top toward both ends in a width direction of the hardened convex portion 13. Herein, the maximum height LK1 of the hardened convex portion 13 is a length in the circumferential direction from the flat surface of the first circumferential direction end surface 11 along the outer circumferential surface of the sliding bearing to the top of the hardened convex portion 13. Herein, the width HK1 is a length of the hardened convex portion 13 in the axial direction of the sliding bearing in the first circumferential direction end surface 11.

The hardened concave portion 14 has a width HK2 in the axial direction and has the bottom having a maximum depth LK2 on a central portion of the width (see FIG. 5). The depth of the hardened concave portion 14 gradually decreases from the bottom toward both ends in a width direction of the hardened concave portion 14. Herein, the maximum depth LK2 of the hardened concave portion 14 is a length in the circumferential direction from the flat surface of the second circumferential direction end surface 12 along the outer circumferential surface (virtual surface) of the sliding bearing to the bottom of the hardened concave portion 14. Herein, the width HK2 is a length of the hardened concave portion 14 in the axial direction of the sliding bearing in the second circumferential direction end surface 12.

Note that in the views illustrating the first embodiment, the outline of each of the hardened convex portion and the hardened concave portion is illustrated such that it has the substantially circular arc shape, but it has only to be formed with a curved line.

A dimensional relation between the maximum height LK1 of the hardened convex portion 13 and the maximum depth LK2 of the corresponding hardened concave portion 14 is LK1>LK2. Further, a dimensional relation between the width HK1 of the hardened convex portion 13 and the width HK2 of the corresponding hardened concave portion 14 is HK1<HK2.

In the first embodiment, the maximum heights LK1 of the plurality of hardened convex portions 13 are the same as each other, and the widths HK1 of the plurality of hardened convex portions 13 are the same as each other. Further, the maximum depths LK2 of the plurality of hardened concave portions 14 are the same as each other, and the widths HK2 of the plurality of hardened concave portions 14 are the same as each other. However, the present invention is not limited to the first embodiment, and it is possible to set the plurality of hardened convex portions to different dimensions from each other and set the plurality of hardened concave portions to different dimensions from each other as long as the configuration of the present invention can be realized. Further, it is possible to set the number of each of the hardened convex portions and the hardened concave portions to be three or more.

Figure 6:
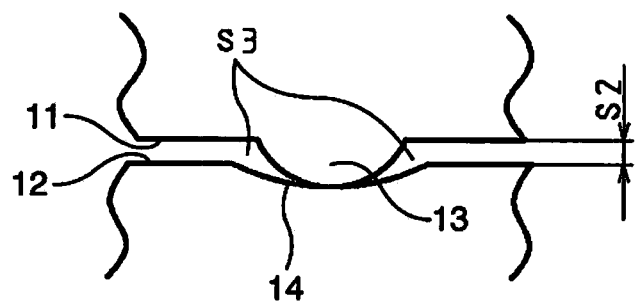
FIG. 6 is a view illustrating a state that a top of a hardened convex portion comes in contact with a bottom of a hardened concave portion in FIG. 5.

Further, as illustrated in FIG. 6, a second circumferential direction space S2 is formed between the first circumferential direction end surface 11 and the second circumferential direction end surface 12 in a state that the first circumferential direction end surface 11 butts against the second circumferential direction end surface 12, and the top of the hardened convex portion 13 comes in contact with the bottom of the hardened concave portion 14.

Further, when the top of the hardened convex portion 13 comes in contact with the bottom of the hardened concave portion 14, spaces S3 are formed on both sides of the contact portion between the top and the bottom (in the axial direction of the sliding bearing).

As an example, dimensions of the first embodiment are described. For example, the outside diameter of the sliding bearing is 30 mm, the sliding bearing wall thickness is 2.0 mm, the Fe alloy back metal layer thickness in the sliding bearing wall thickness is 1.7 mm, and the width in the axial direction of the sliding bearing is 20 mm. In this case, the maximum height LK1 of the hardened convex portion is about 1.5 mm, and its width HK1 is about 3 mm, and the maximum depth LK2 of the hardened concave portion is about 1 mm, and its width HK2 is about 4 mm. When the top of the hardened convex portion comes in contact with the bottom of the hardened concave portion, the second circumferential direction space S2 between the flat surface of the first circumferential direction end surface and the flat surface of the other circumferential direction end surface is 0.5 mm.

As the Fe alloy back metal layer, the typical low carbon steel plate having a carbon content of 0.2 mass % was used. The value of the hardness in the non-hardened area measured with the micro Vickers hardness meter was 160 mHv, and the value of the hardness of the top of the hardened convex portion was 240 mHv. The range θ1 of the first hardened area KR1 was 7°. The value of the hardness of the bottom of the hardened concave portion was 239 mHv, and the range θ2 of the second hardened area KR2 was 7°.

The present invention is not limited to the dimensions of the embodiment. Depending on the specification of the sliding bearing (mainly, outside diameter, width, wall thickness and the like), the dimensions and the number of each of the hardened convex portions and the hardened concave portions can be changed. As an example, the maximum height LK1 of the hardened convex portion is preferably a length corresponding to 0.3 to 2% of the outer circumferential length of the sliding bearing. Further, the maximum depth LK2 of the hardened concave portion is preferably smaller by at least 0.3 mm or more than the maximum height LK1 of the hardened convex portion.

Further, when the top of the hardened convex portion comes in contact with the bottom of the hardened concave portion, the second circumferential direction space S2 between the flat surface of the first circumferential direction end surface and the flat surface of the other circumferential direction end surface is preferably a length corresponding to 0.2 to 1% of the outer circumferential length of the sliding bearing.

The width HK1 of the hardened convex portion is preferably about 1 to 4 mm. The width HK2 of the hardened concave portion is preferably about 1.5 to 5 mm. The top of the hardened convex portion is preferably formed apart by 5 to 10 mm from the top of other hardened convex portion in the axial direction of the sliding bearing. In other words, the axial direction central position of the width HK1 of the hardened convex portion is preferably formed apart by 5 to 10 mm from the axial direction central position of the width HK1 of other hardened convex portion in the axial direction of the sliding bearing. Note that the same applies to a position relation between the bottoms of the hardened concave portions (axial direction central position of the width HK2 of the hardened concave portion). Further, the hardened convex portion is preferably formed such that the top of the hardened convex portion (axial direction central position of the width HK1 of the hardened convex portion) is located apart by 3 mm or more from the end in the axial direction of the sliding bearing. The same applies to a position relation between the bottom of the hardened concave portion and the end in the axial direction of the sliding bearing. However, in a case where the present invention is applied to a sliding bearing having a small width dimension in the axial direction, the present invention is not limited to these dimensions.

Figure 9:
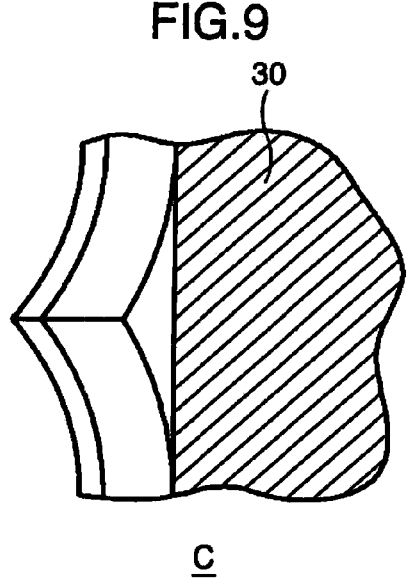
FIG. 9 is an enlarged view of a portion C of FIG. 8.

Next, description is given of action of the present invention. For comparison, description is given of a conventional sliding bearing at first. When the conventional sliding bearing is press-fitted into a bearing holding hole of a bearing housing 30, the sliding bearing is elastically deformed by external force in a direction in which a circumferential length decreases (see FIG. 8). In a case where deformation resistance is the same across the whole length in the circumferential direction of the Fe alloy back metal layer of the sliding bearing, the same elastic deformation occurs at any portions in the circumferential direction of the sliding bearing. In FIG. 8, a length of a two direction arrow denotes an elastic deformation amount. In the pushing portion of the circumferential direction both end surfaces, one of or both of the circumferential direction end surfaces may be deformed toward an inside diameter side of the bearing because sliding and a stress concentration portion between the circumferential direction end surfaces are easily formed (see FIG. 9).

As for the present invention,

I (1): since the hardened areas including the hardened convex portion and the hardened concave portion are previously formed by the compressive external force in the circumferential direction of the sliding bearing, the residual stress showing the maximum deformation resistance to the compressive external force in the circumferential direction of the sliding bearing is generated inside the Fe alloy back metal layer of the hardened area.

I (2): Further, the hardened areas are locally formed on the circumferential direction both ends of the sliding bearing. The deformation resistance of the Fe alloy back metal layer in the hardened areas of the circumferential direction both ends of the bearing is relatively larger than the deformation resistance in the non-hardened area.

Because of I (1) and I (2), when the sliding bearing is press-fitted into the bearing holding hole of the bearing housing 30, as illustrated in FIG. 7, the elastic deformation amount of the non-hardened area occupying the most part of the cylindrical portion of the sliding bearing becomes larger, and thus the elastic deformation amount of the hardened area θ3 of the circumferential direction both ends becomes smaller. In FIG. 7, a length of a two direction arrow denotes the elastic deformation amount.

II: Next, description is given of action of the second circumferential direction space S2. When the sliding bearing is press-fitted into a bearing holding hole, in the circumferential direction both end surfaces of the sliding bearing, only the top of the hardened convex portion comes in contact with the bottom of the hardened concave portion, and the flat surfaces of the circumferential direction both end surfaces do not come in contact with each other, so that the flat surfaces of the circumferential direction end surfaces do not push each other. Alternatively, the flat surfaces may come in contact with each other in the present invention, but even in this case, pushing by the contact is mainly performed by the contact portion between the top of the hardened convex portion and the bottom of the hardened concave portion, and thus pushing pressure between the flat surfaces is small. Therefore, the flat portion of the circumferential direction end surface is not easily deformed toward the inside diameter side of the bearing.

Though the pushing pressure is large in the contact portion between the top of the hardened convex portion and the bottom of the hardened concave portion of the circumferential direction both end surfaces, the ends near the top of the hardened convex portion and the bottom of the hardened concave portion are not easily deformed toward the inside diameter side of the bearing. The reason is that as described above, inside the Fe alloy back metal layer in the hardened areas including the hardened convex portion and the hardened concave portion, the residual stress is generated so as to show the maximum deformation resistance to the compressive external force in the circumferential direction of the sliding bearing, and thus the deformation does not easily occur (action of the above I (1)). Further, it is because of action of III described below.

III: In the hardened areas, the hardness (deformation resistance) of the Fe alloy back metal layer of top of the hardened convex portion and the bottom of the hardened concave portion is the maximum and gradually decreases toward the circumferential direction central portion side of the sliding bearing. More specifically, as for the hatching portions (hardened areas) illustrated in FIG. 4, the deformation resistance decreases radially from the top of the hardened convex portion and the bottom of the hardened concave portion toward the outer edge line sides of the hatching portions.

The pushing pressure of the contact portion between the top of the hardened convex portion and the bottom of the hardened concave portion is transmitted from the contact portion toward the whole Fe alloy back metal layer in the hardened areas located on the circumferential direction central portion side of the sliding bearing, and is alleviated by the elastic deformation of the whole Fe alloy back metal layer in the hardened areas. Further, in the hardened area, the deformation resistance decreases radially, and thus even in the hardened area, the elastic deformation amount becomes larger on the circumferential direction central portion side of the sliding bearing, and the elastic deformation amount near the contact portion between the top of the hardened convex portion and the bottom of the hardened concave portion becomes extremely smaller.

Note that unlike the present invention, in a case where the hardness (deformation resistance) of the whole Fe alloy back metal layer in the hardened area is constant, the vicinity of the contact portion between the top of the hardened convex portion and the bottom of the hardened concave portion cannot avoid becoming an extremely high pressure state to be plastically deformed, or swelling toward the inside diameter side of the bearing due to the increasing of the elastic deformation amount.

IV: Further, the dimensions and the shapes of the hardened convex portion and the hardened concave portion are not matched. As illustrated in FIG. 6, the spaces S3 are formed on the axial direction both sides of the contact portion between the top of the hardened convex portion and the bottom of the hardened concave portion (right and left of the contact portion in the paper surface of FIG. 6). The slight elastic deformation near the contact portion between the top of the hardened convex portion and the bottom of the hardened concave portion also occurs toward the space S3 side, and thus the elastic deformation toward the inside diameter side of the bearing does not easily occur even further.

Unlike the present invention, in a case where the dimensions and the shapes of the hardened convex portion and the hardened concave portion are matched, the side surfaces of the hardened convex portion and the hardened concave portion are restricted each other, and the hardened convex portion and the hardened concave portion are deformed by only swelling mainly toward the inside diameter side of the bearing. Further, the second circumferential direction space S2 is not formed between both circumferential direction end surfaces, and thus the flat surfaces come in contact with and push each other.

Figure 12:
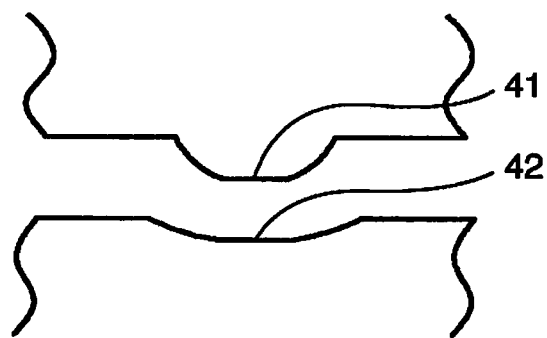
FIG. 12 is a view illustrating a second embodiment of the present invention.

FIG. 12 illustrates a second embodiment. Unlike the first embodiment, it is possible to form flat portions 41, 42 on a top of a hardened convex portion and a bottom of a hardened concave portion, respectively.

Figure 13:
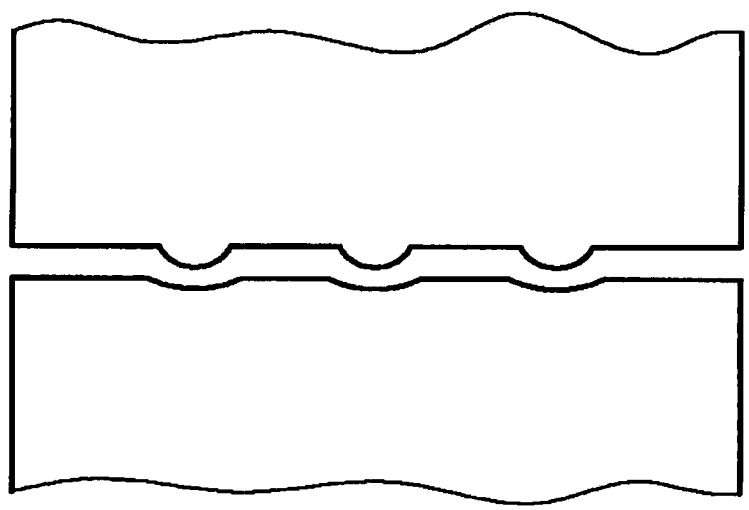
FIG. 13 is a view illustrating a third embodiment of the present invention.

FIG. 13 illustrates a third embodiment. Unlike the first embodiment, three pairs of a hardened convex portion and a hardened concave portion are formed on circumferential direction end surfaces. It is possible to form four or more pairs of the hardened convex portion and the hardened concave portion.

Figure 14:
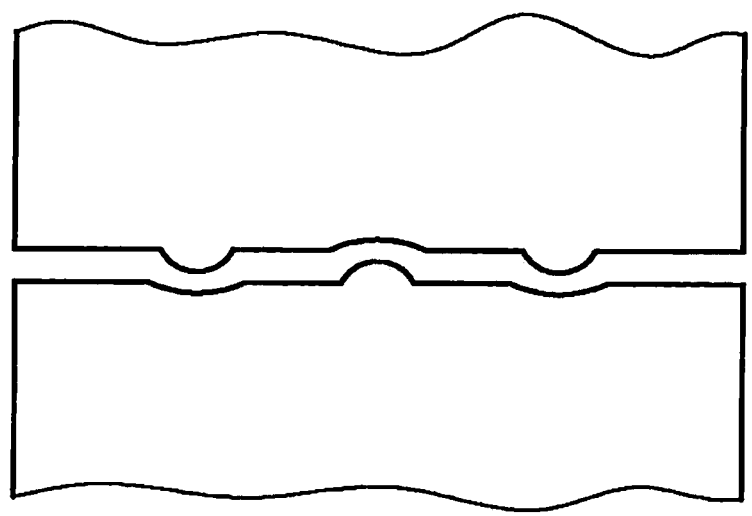
FIG. 14 is a view illustrating a fourth embodiment of the present invention.

FIG. 14 illustrates a fourth embodiment. Unlike the first embodiment, it is possible to form a hardened convex portion and a hardened concave portion on one of circumferential direction end surfaces, and form a corresponding hardened convex portion and hardened concave portion on the other one of the circumferential direction end surfaces.

Figure 15:
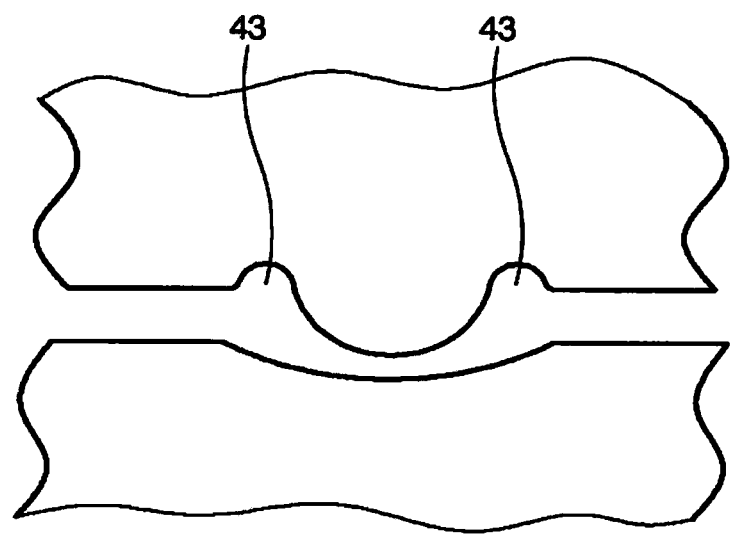
FIG. 15 is a view illustrating a fifth embodiment of the present invention.

FIG. 15 illustrates a fifth embodiment. Unlike the first embodiment, it is possible to form tiny concave portions 43 between axial direction both ends of a hardened convex portion and flat surfaces.

Note that the composition of the Fe alloy back metal layer is not limited to the carbon steel used in the embodiment. Even in a case where a different Fe alloy is used, it is possible to obtain an action and effect by the difference of the hardness (deformation resistance) of the Fe alloy back metal layer in the hardened area and the non-hardened area.

It is possible to form chamfers on corners of the axial direction both ends of the sliding bearing on the outer circumferential surface side and the inner circumferential surface side (that is, the corner of the axial direction end surface of the sliding bearing and the outer circumferential surface or the inner circumferential surface).

It is possible to form chamfers on the flat surface portions of the circumferential direction both end surfaces of the sliding bearing on the inside diameter side of the sliding bearing. Further, it is possible to form a chamfer on the edge portion of the hardened convex portion or the hardened concave portion of the sliding bearing on the inside diameter side of the sliding bearing.

It is possible to form an oil groove and an oil pocket (recess) on the inner circumferential surface (sliding surface) of the sliding bearing and form an oil hole passing through the wall thickness of the sliding bearing. Further, by forming the oil groove, the oil pocket (recess), the oil hole and the like, there may be a locally hardness increasing portion on the Fe alloy back metal layer of the cylindrical portion in the non-hardened area of the sliding bearing.

On the surface of the Fe alloy layer of the sliding bearing, a covering layer made of a metal such as Sn, Cu, or a resin may be formed in order to prevent rust.

While the forming method of the hardened convex portion and the hardened concave portion is described with reference to FIGS. 10 and 11 and related description, the forming method is not limited to this method. For example, a small concave portion may be previously formed on the circumferential direction end surface on the left side of the plate illustrated in FIG. 10 at a position to be in contact with the projection. It is of course necessary that this concave portion is smaller than the size of the hardened concave portion to be obtained as a result.

In the sliding bearing of the present invention, after the sliding bearing is press-fitted into the bearing holding hole of the bearing housing, the cutting or the grinding can be performed on the surface portion of the sliding layer.

The invention claimed is:

1. A sliding bearing having a cylindrical shape, comprising:
   a Fe alloy back metal layer on an outside diameter side of the cylindrical shape and a sliding layer on an inside diameter side of the cylindrical shape; and
   a first circumferential direction end surface and a second circumferential direction end surface, the first circumferential direction end surface and the second circumferential direction end surface facing each other, wherein
   there is a first circumferential direction space between the first circumferential direction end surface and the second circumferential direction end surface,
   a plurality of hardened convex portions projecting toward the second circumferential direction end surface and a flat surface being formed on the first circumferential direction end surface,
   a plurality of hardened concave portions corresponding to the plurality of hardened convex portions and a flat surface being formed on the second circumferential direction end surface,
   a dimensional relation between a maximum height LK1 of a top of each of the hardened convex portions and a maximum depth LK2 of a bottom of each of the corresponding hardened concave portions being LK1>LK2,
   each of the hardened convex portions having a width HK1 in an axial direction of the sliding bearing on the first circumferential direction end surface, and each of the hardened concave portions having a width HK2 in the axial direction on the second circumferential direction end surface,
   a dimensional relation between the width HK1 of each of the hardened convex portions and the width HK2 of each of the corresponding hardened concave portions having HK1<HK2,
   a first hardened area KR1 being formed on each of the hardened convex portions of the first circumferential direction end surface and its vicinity, the Fe alloy back metal layer being hardened in the first hardened area KR1 such that a hardness of the Fe alloy back metal layer is maximum on the top of each of the hardened convex portions and decreases toward a circumferential direction central portion side of the sliding bearing, and a second hardened area KR2 being formed on each of the hardened concave portions of the second circumferential direction end surface and its vicinity, the Fe alloy back metal layer being hardened in the second hardened area KR2 such that a hardness of the Fe alloy back metal layer is maximum on the bottom of each of the hardened concave portions and decreases toward the circumferential direction central portion side of the sliding bearing.

2. The sliding bearing according to claim 1, wherein the plurality of hardened convex portions and a plurality of flat surfaces are formed on the first circumferential direction end surface, each of the hardened convex portions and each of the flat surfaces being alternately arranged in the axial direction of the sliding bearing, and both ends in the axial direction being the flat surfaces.

3. The sliding bearing according to claim 2, wherein each of the flat surfaces of the first circumferential direction end surface and each of the flat surfaces of the second circumferential direction end surface extend in a direction intersecting perpendicularly with the circumferential direction of the sliding bearing.

4. The sliding bearing according to claim 1, wherein the plurality of hardened concave portions and a plurality of flat surfaces are formed on the second circumferential direction end surface, each of the hardened concave portions and each of the flat surfaces being alternately arranged in the axial direction of the sliding bearing, and both ends in the axial direction being the flat surfaces.

5. The sliding bearing according to claim 4, wherein each of the flat surfaces of the first circumferential direction end surface and each of the flat surfaces of the second circumferential direction end surface extend in a direction intersecting perpendicularly with the circumferential direction of the sliding bearing.

6. The sliding bearing according to claim 1, wherein the maximum height LK1 of the top of each of the hardened convex portions is located on a central portion of the width HK1, and a height of each of the hardened convex portions decreases from the top toward both ends in a width direction of each of the hardened convex portions.

7. The sliding bearing according to claim 1, wherein the maximum depth LK2 of the bottom of each of the hardened concave portions is located on a central portion of the width HK2, and a depth of each of the hardened concave portions decreases from the bottom toward both ends in a width direction of each of the hardened concave portions.

8. The sliding bearing according to claim 1, wherein the maximum height LK1 of each of the hardened convex portions has a length corresponding to 0.3 to 2% of an outer circumferential length of the sliding bearing which is a length in the circumferential direction along an outer circumferential surface of the sliding bearing, and includes the hardened convex portions and the hardened concave portions.

9. The sliding bearing according to claim 1, wherein the maximum heights LK1 of the plurality of hardened convex portions are the same as each other and the widths HK1 of the plurality of hardened convex portions are the same as each other, and the maximum depths LK2 of the plurality of hardened concave portions are the same as each other and the widths HK2 of the plurality of hardened concave portions are the same as each other.

10. The sliding bearing according to claim 1, wherein a second circumferential direction space is formed between the flat surface of the first circumferential direction end surface and the flat surface of the second circumferential direction end surface in a state that the first circumferential direction end surface butts against the second circumferential direction end surface and the top of each of the hardened convex portions comes in contact with the bottom of each of the hardened concave portions.

11. The sliding bearing according to claim 10, wherein the second circumferential direction space has a length corresponding to 0.2 to 1% of an outer circumferential length of the sliding bearing which is a length in the circumferential direction along an outer circumferential surface of the sliding bearing, and includes the hardened convex portions and the hardened concave portions.

12. The sliding bearing according to claim 1, wherein the plurality of hardened convex portions are formed on only the first circumferential direction end surface, and the plurality of hardened concave portions are formed on only the second circumferential direction end surface.

13. The sliding bearing according to claim 1, wherein at least one of the hardened convex portions is also formed on the second circumferential direction end surface, and at least one of the hardened concave portions is also formed on the first circumferential direction end surface.

14. The sliding bearing according to claim 1, wherein the first hardened area KR1 of the first circumferential direction end surface is formed within a range of a central angle of 2° to 15° from the top of each of the hardened convex portions toward the circumferential direction central portion side of the sliding bearing.

15. The sliding bearing according to claim 1, wherein the second hardened area KR2 of the second circumferential direction end surface is formed within a range of a central angle of 2° to 15° from the bottom of each of the hardened concave portions toward the circumferential direction central portion side of the sliding bearing.

* * * * *